July 2, 1935.  E. C. J. PURTON  2,006,873
MEASURING INSTRUMENT
Filed Feb. 15, 1934
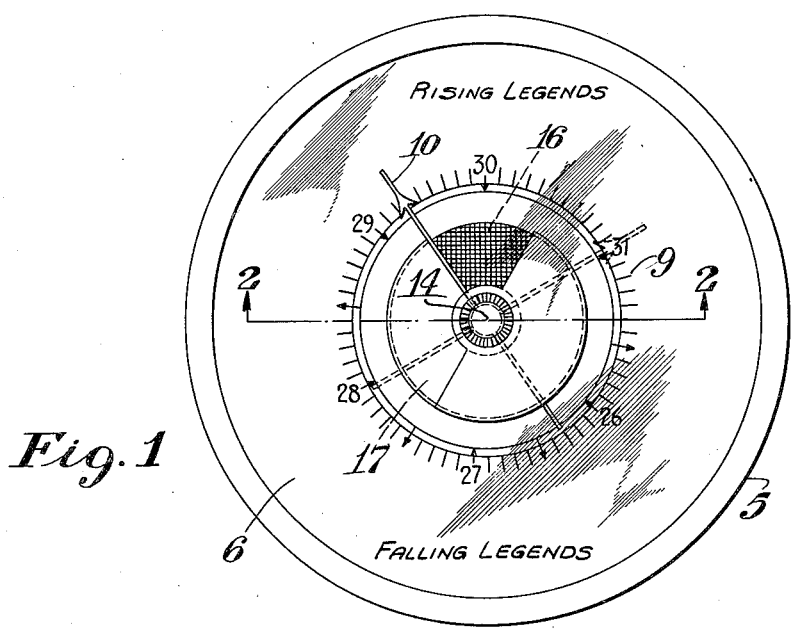
Fig.1
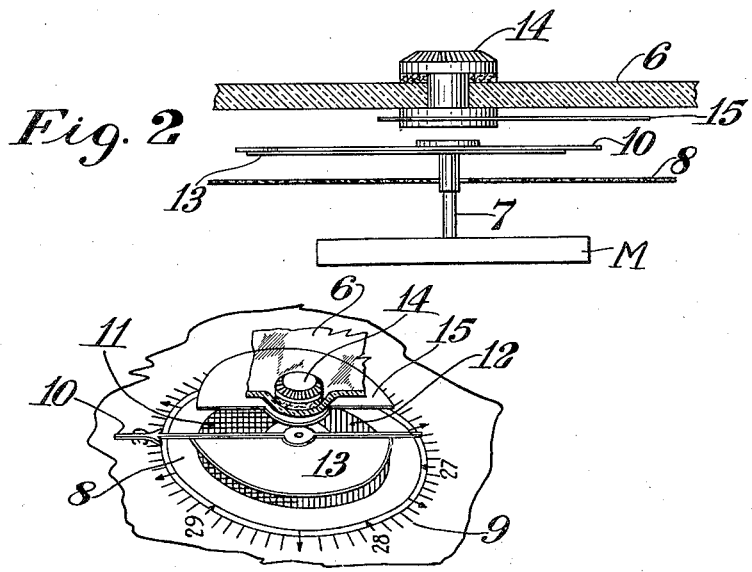
Fig.2
Fig.3
INVENTOR
E.C.J. PURTON
BY D. Clyde Jones
ATTORNEY Patented July 2, 1935

2,006,873

UNITED STATES PATENT OFFICE 2,006,873

MEASURING INSTRUMENT

Ernest C. J. Purton, Rochester, N. Y., assignor to Taylor Instrument Companies, Rochester, N. Y., a corporation of New York Application February 15, 1934, Serial No. 711,385

5 Claims. (Cl. 116—129)

This invention relates to measuring instruments.

In certain types of measuring instruments, notably in aneroid barometers, wherein an index moves with reference to a scale to give a measurement, it is customary to provide a settable reference index to be positioned in registry with the first index in order to indicate the direction of movement of said first index. The presence of two indexes at the front of the instrument is frequently confusing to those inexperienced in reading such devices.

In accordance with the present invention, novel means are provided for indicating the direction of movement of the index of an instrument without the need for a second reference index.

For a clearer understanding of the invention reference is made to the drawing in which Fig. 1 is a front view of an instrument containing the present improvement; Fig. 2 is a fragmentary cross-sectional view thereof taken substantially on the line 2—2 of Fig. 1; and Fig. 3 is a fragmentary perspective view of the instrument dial and the mechanism mounted in front of it.

Referring to Fig. 1, 5 designates an instrument casing, the front of which is closed by a transparent crystal 6. Within the casing there is mounted the operating mechanism generally indicated at M of the instrument, which mechanism serves to rotate the arbor 7 in accordance with the condition to be measured. This arbor extends through a central opening in a dial 8 which is suitably graduated as indicated at 9 in accordance with the unit of measure of the condition to be measured. The arbor 7 carries at its free end an index or pointer 10 to move the same in accordance with the changing conditions with reference to the graduated scale 9.

On the front surface of the dial 8 and within the graduated scale 9, there are two areas 11 and 12, of contrasting colors such as red and black, herein shown as being semicircular in shape. The index 10 carries a mask of light-weight opaque material 13, preferably white in appearance, and of such area as to hide one half of the colored areas 11 and 12. The crystal 6 has a central opening therein in which a knurled button is frictionally mounted for rotation in superimposed relation to the end of the arbor 7. This button likewise carries at the under side of the crystal an opaque mask 15 of white appearance and of such size and shape as to conceal one half of the colored areas 11 and 12.

In order to adjust the indicating means to show any change in the position of the index 10, the knurled button 14 is turned to move the mask 15 so that in cooperation with the mask 13 carried by the index 10, the colored areas 11 and 12 are concealed from view (see Fig. 3). If the index 10 moves counterclockwise in response to a changing condition, the mask 13 will move to the position indicated in Fig. 1, thereby causing a sector-shaped opening 16 to appear between the masks 13 and 15. A portion of the colored area 12 will then be visible through this opening. However, if the index 10 moves clockwise a sector-shaped opening 17, indicated in part by dotted lines in Fig. 1, will appear between masks 13 and 15 through which a portion of the colored area 11 is visible. Thus when the index 10 moves in a clockwise direction, one color is visible, but when the index moves in a counterclockwise direction the other color is visible from the front of the instrument.

If the present invention is employed in an aneroid barometer, the appearance of one color indicates a rising barometric pressure, whereas the appearance of the other color indicates a falling barometric pressure. Suitable legends corresponding to the rising and falling barometric conditions may be printed on the dial so that an inexperienced observer by noting the color visible at the front of the instrument can readily determine which series of legends is appropriate under the prevailing conditions.

I claim:

1. In a measuring instrument having a dial, an index movable with respect thereto and mechanism for operating said index in accordance with the measurement to be made, two areas of contrasting appearance at the front of said dial, a mask movable by said index and arranged to conceal a portion only of said areas, and a second mask manually adjustable to conceal another portion of said areas, whereby movement of said first mask exposes an increased amount of one or the other of said areas depending on the direction of movement of the index.

2. In a measuring instrument having a dial, an index movable with respect thereto and mechanism for operating said index in accordance with the measurement to be made, two areas of contrasting appearance at the front of said dial, a mask movable by said index and arranged to conceal only a portion of said areas from the front of the instrument, and a second mask manually adjustable to conceal only the remainder of said areas from the front of said instrument, whereby movement of said first mask exposes a portion of one or the other of said areas depending on the direction of movement of the index.

3. In a measuring instrument having a dial, an index rotatable with respect thereto, and mechanism for rotating said index in accordance with the measurement to be made, two semicircular areas of equal diameters and having a common center at the axis of rotation of said index, said areas being of contrasting colors and being located at the front of said dial, and two semicircular masks of a size jointly to conceal said areas from the front of the instrument, one of said masks being manually adjustable to establish a reference point for indicating movement of said index and the other mask being rotated by said index to expose a portion of one or the other of said colored areas depending on the direction of movement of said index.

4. In a measuring instrument having a dial, an index rotatable with respect thereto, mechanism for operating said index in accordance with the measurement to be made, a transparent closure for the front of said instrument and exposing said dial, a circular area on said dial having its center at the axis of rotation of said index, a portion of said area being of one appearance and the other portion thereof being of contrasting appearance with respect to the first, a semicircular mask mounted on said index with the center of said mask at the axis of rotation of said index, said mask being movable with said index to expose a part of said circular area, and a second semicircular mask mounted on said transparent closure with the center of said mask at the axis of rotation of said index, said second mask being adjustable from the front of said closure, whereby the direction of movement of said index is indicated.

5. In a measuring instrument having a dial, an index movable with respect thereto, mechanism for moving said index in accordance with the measurement to be made, two areas of contrasting appearance visible from the front of said dial, and means including a manually settable mask concealing a portion of each of said areas, the movement of said index in one direction resulting in the exposure of a portion of one of said areas, while the movement of said index in the other direction results in the exposure of a portion of the other area.

ERNEST C. J. PURTON.